(12) United States Patent
Abe et al.

(10) Patent No.: US 11,132,549 B2
(45) Date of Patent: Sep. 28, 2021

(54) MEASUREMENT RESULT DISPLAY APPARATUS AND PROGRAM

(71) Applicant: Mitutoyo Corporation, Kanagawa (JP)

(72) Inventors: Shinsaku Abe, Hokkaido (JP); Hideyuki Kusanagi, Hokkaido (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 16/814,420

(22) Filed: Mar. 10, 2020

(65) Prior Publication Data

US 2020/0293779 A1    Sep. 17, 2020

(30) Foreign Application Priority Data

Mar. 11, 2019 (JP) .............................. JP2019-044122
Feb. 7, 2020 (JP) .............................. JP2020-019605

(51) Int. Cl.
*G06K 9/00* (2006.01)
*G06K 9/46* (2006.01)
*G06F 3/01* (2006.01)

(52) U.S. Cl.
CPC ......... *G06K 9/00671* (2013.01); *G06F 3/012* (2013.01); *G06K 9/00201* (2013.01); *G06K 9/46* (2013.01); *G06K 2209/21* (2013.01)

(58) Field of Classification Search
CPC .. G06K 9/00671; G06K 9/00201; G06K 9/46; G06K 2209/21; G06F 3/012
See application file for complete search history.

(56) References Cited

U.S. PATENT DOCUMENTS

2002/0044104 A1\* 4/2002 Friedrich ............. G05B 19/409
                                                                345/8
2010/0232647 A1\* 9/2010 Fujieda .............. G06K 9/00214
                                                                382/103

\* cited by examiner

*Primary Examiner* — Edward Martello
(74) *Attorney, Agent, or Firm* — Rankin, Hill & Clark LLP

(57) ABSTRACT

The measurement result display apparatus of the present invention includes: a storage unit for storing shape information and a predetermined measurement result with respect to an object to be measured; a three-dimensional sensor for detecting shape information of an object existing in a three-dimensional space; a display unit configured so that the object detected by the three-dimensional sensor can be visually recognized and configured to be capable of displaying predetermined information; and a display control unit for displaying the predetermined measurement result of a target object on the display unit so as to be visually recognized together with the object, using the object to be measured whose shape information is detected by the three-dimensional sensor as the target object.

7 Claims, 7 Drawing Sheets

MEASUREMENT RESULT DISPLAY APPARATUS AND PROGRAM

CROSS-REFERENCE TO RELATED APPLICATION

This non-provisional application claims priority under 35 U.S.C. § 119(a) from Japanese Patent Application No. 2019-044122, filed on Mar. 11, 2019, and Japanese Patent Application No. 2020-019605, filed on Feb. 7, 2020, the entire contents of which are incorporated herein by reference.

BACKGROUND

Technical Field

The present invention relates to a measurement result display apparatus and a program capable of viewing a measurement result of a desired object to be measured.

Background Art

For example, it is assumed that the measurement result obtained by measuring the shape of a certain portion with an unevenness of an object to be measured is stored in a storage means for a plurality of objects to be measured. At this time, when it is desired to refer to the measurement result of any of the objects to be measured, a method can be adopted in which a desired measurement result is extracted by searching based on a file name, date, or the like corresponding to the measurement result, or a method in which a desired measurement result is managed and extracted using dedicated software.

SUMMARY OF THE INVENTION

Problems to be Solved by the Invention

In the case of managing based on the file name, regularity is necessary for storing the file and assigning the file name, and the user needs to have a skill to perform the search under the regularity. In the case of a management method using software, it is necessary to activate the software in order to browse the information. A simple configuration of the software requires a technique for managing and searching information, and there is a problem in that it is costly to improve usability of the software.

It is an object of the present invention to provide a measurement result display apparatus and a program capable of viewing a measurement result of a desired object to be measured.

Means for Solving the Problems

The measurement result display apparatus of the present invention includes: a storage unit for storing shape information and a predetermined measurement result with respect to an object to be measured; a three-dimensional sensor for detecting shape information of an object existing in a three-dimensional space; a display unit configured so that the object detected by the three-dimensional sensor can be visually recognized and configured to be capable of displaying predetermined information; and a display control unit for displaying the predetermined measurement result of a target object on the display unit so as to be visually recognized together with the object, using the object to be measured whose shape information is detected by the three-dimensional sensor as the target object.

As a result, the measurement result of the desired object to be measured is displayed on the display unit only by detecting the object to be measured by the three-dimensional sensor, thereby the measurement result can be easily browsed.

The measurement result display apparatus may further include an extraction unit for retrieving and extracting the predetermined measurement result of the target object from the storage unit based on the shape information detected by the three-dimensional sensor. The storage unit may store shape information and the predetermined measurement result for each of the plurality of objects to be measured in advance, and the display control unit may display the predetermined measurement result of the object extracted by the extraction unit on the display unit so as to be visually recognized together with the object.

The measurement result display apparatus of the present invention may be configured as a head-mounted display device or a wearable device mounted on the head of a user, in which the display unit is disposed so as to face the eyes of the user and the three-dimensional sensor is disposed so as to detect shape information of the object existing in the display range of the display unit.

By the user wearing the measurement result display apparatus configured as described above on the head, the measurement result of the target object can be displayed on the display unit only by the user looking at the target object.

The display control unit may change the display position of the predetermined measurement result in accordance with the change of the detection position of the target object detected by the three-dimensional sensor with the movement of the head of the user.

This can prevent the display from disappearing due to the movement of the head.

The storage unit may further store a measurement point on the object to be measured corresponding to the predetermined measurement result. The extraction unit may further extract the measurement point on the object to be measured corresponding to the predetermined measurement result. The display control unit may cause the display unit to display the predetermined measurement result of the target object so as to be understood which portion of the target object visible on the display unit corresponds to the measurement point corresponding to the predetermined measurement result.

As a result, the measurement result can be grasped more concretely and intuitively.

The measurement result display apparatus may further include a measurement result acquisition unit that causes a measuring instrument that executes measurement of the object to be measured to execute a predetermined measurement to acquire a result, and causes the three-dimensional sensor to detect the shape information of the object to be measured and a measurement point by the measuring instrument at the time of execution of the measurement, and stores the shape information of the object to be measured and the predetermined measurement result at the measurement point in the storage unit.

This makes it possible to collect information on the measurement result used in the measurement result display apparatus of the present invention.

The measurement result display apparatus may further include an imaging unit for imaging the object detected by the three-dimensional sensor. The storage unit may further store predetermined individual identification information corresponding to each of the plurality of objects to be measured, and the extraction unit may retrieve and extract the predetermined measurement result of the target object by searching the storage unit based on shape the information detected by the three-dimensional sensor and predetermined individual identification information indicated on the target object imaged by the imaging unit.

Thereby, even when there is a plurality of objects to be measured having the same shape, the measurement result of the target object can be extracted based on the individual identification information.

The functions of the components of the measurement result display apparatus of the present invention may be realized by being described in a program and executed by a computer.

DETAILED DESCRIPTION OF THE EMBODIMENTS

Figure 1:
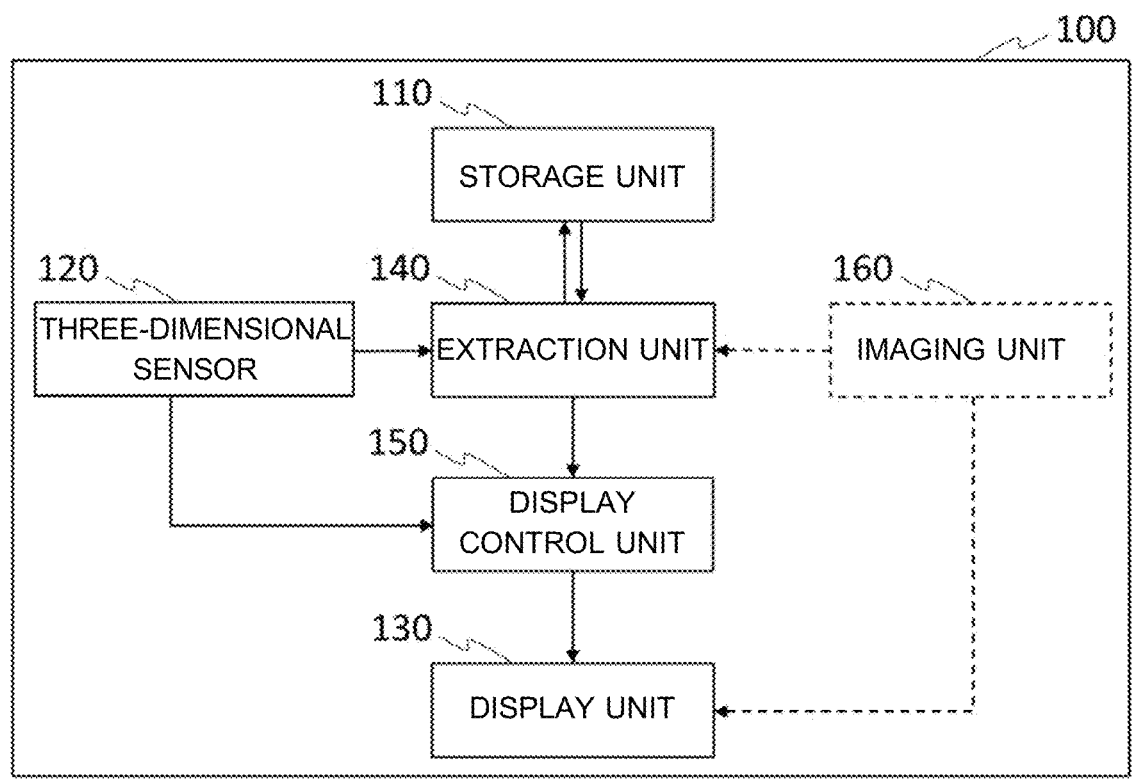
FIG. 1 is a functional block diagram of a measurement result display apparatus 100 of the present invention.

Embodiments of the present invention will be described below with reference to the drawings. In the following description, the same parts are denoted by the same reference numerals, and the description of the parts once described is appropriately omitted.

First Embodiment

FIG. 1 is a functional block diagram of a measurement result display apparatus 100 of the present invention. The measurement result display apparatus 100 includes a storage unit 110, a three-dimensional sensor 120, a display unit 130, an extraction unit 140, and a display control unit 150.

The storage unit 110 stores shape information and predetermined measurement results in advance for each of a plurality of objects to be measured. The predetermined measurement is arbitrary as long as it is for the shape of the object. The measurement items by predetermined measurement may include, for example, flatness, roundness, and cylindricity in addition to simple dimensions. The measuring instrument used in obtaining the predetermined measurement result is arbitrary.

Any type of storage means can be used as the storage unit 110 as long as it can store shape information and the predetermined measurement result. The storage unit 110 is not necessarily provided in the main body of the measurement result display apparatus 100, and may be provided outside the main body so that information can be exchanged via wired communication or wireless communication.

The three-dimensional sensor 120 detects shape information of an object existing in a three-dimensional space by an arbitrary method. More specifically, for example, the three-dimensional sensor 120 may specify a plurality of feature points characterizing the shape of the object, and acquire three-dimensional coordinates for each feature point. Alternatively, the three-dimensional sensor 120 may acquire three-dimensional shape information of the object from a plurality of two-dimensional images. In this case, an imaging means such as a camera for capturing a two-dimensional image serves as the three-dimensional sensor 120. As the plurality of two-dimensional images, for example, images having different imaging positions (i.e., images with parallax), images having different focusing areas and aperture amounts, and the like can be used.

The display unit 130 is capable of displaying predetermined information. The display unit 130 is configured so that the object detected by the three-dimensional sensor 120 can be visually recognized. The method of making the object visible is arbitrary. For example, the measurement result display apparatus 100 may further include an imaging unit 160, and the image of the object captured by the imaging unit 160 may be displayed so as to be visible. Alternatively, a transmissive display may be employed so that the object is visible through the display.

The extraction unit 140 searches the storage unit 110 based on the detected shape information and extracts the predetermined measurement result of a target object, using the object whose shape information is detected by the three-dimensional sensor 120 among a plurality of objects to be measured whose measurement results are stored in the storage unit 110 as the target object.

Figure 2:
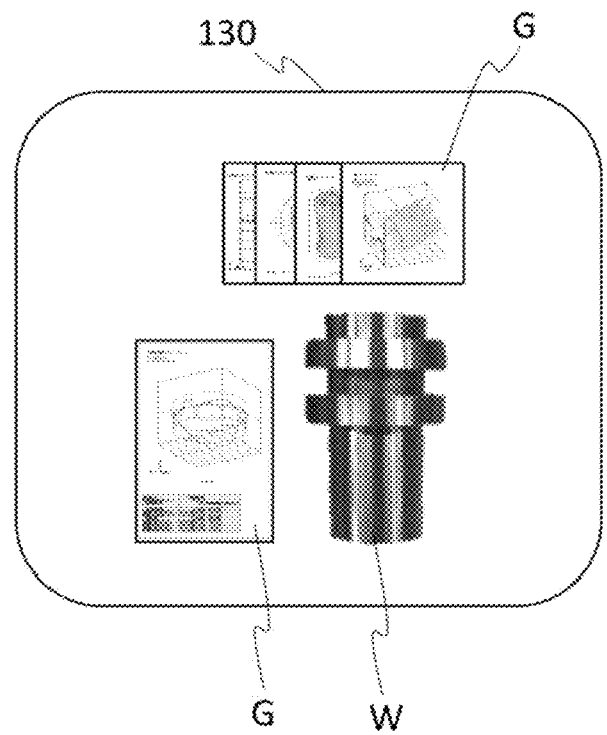
FIG. 2 is a diagram showing a display example of the measurement result.

The display control unit 150 causes the display unit 130 to display the predetermined measurement result of the target object so that the result can be visually recognized within the display unit 130 together with the target object. The display method and the display content of the predetermined measurement result are arbitrary. The display control unit 150 may simply display a numerical value. Alternatively, the display control unit 150 may display graphic information. Since the position of the target object is specified by the three-dimensional sensor, the display position of the measurement result with respect to the target object may be appropriately determined based on the position specified by the three-dimensional sensor. FIG. 2 shows an example of displaying graphic information G relating to the predetermined measurement result together with the target object W on the display unit 130.

Figure 3:
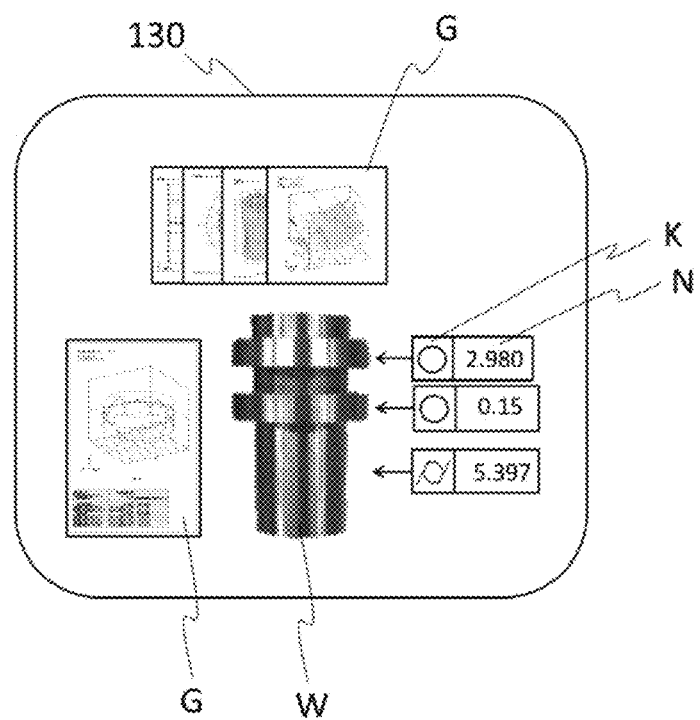
FIG. 3 is a diagram showing another display example of the measurement result.
Figure 4:
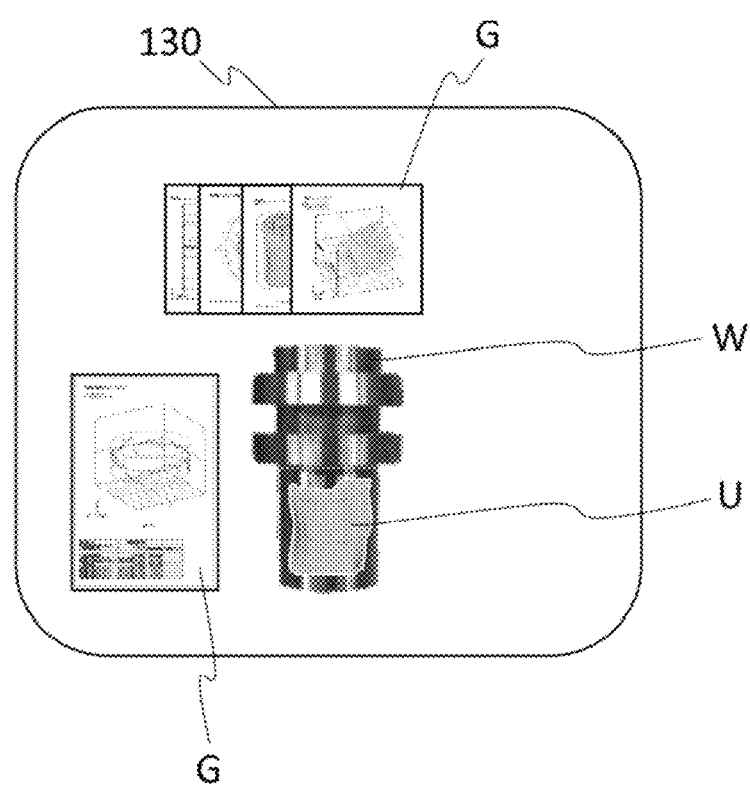
FIG. 4 is a diagram showing still another display example of the measurement results.

FIGS. 3 and 4 show examples in which the predetermined measurement results are more specifically displayed on the display unit 130.

In addition to the graphic information G as shown in FIG. 2, the display example of FIG. 3 further displays the measurement content K (displayed by symbols in this example) and the measurement value N for each measurement point (indicated by an arrow) on the target object W. The measurement content K exemplified in FIG. 3 relates to the measurement by the roundness measuring instrument. The present invention is applicable to measurement by not only a roundness measuring instrument but also an arbitrary measuring instrument such as a three-dimensional measuring instrument. In this case, the measurement content K may correspond to the applied measuring instrument.

In the display example of FIG. 4, in addition to the graphic information G as shown in FIG. 2, a gradation expression U indicating the concavo-convex state of the surface of the target object W is displayed superimposed on the target object W.

By displaying the measurement results as shown in the display examples of FIGS. 3 and 4, the measurement results at the respective measurement points can be listed, and the measurement results can be grasped more concretely and intuitively. In the display examples of FIGS. 3 and 4, the graphic information G is included in the display, but these display examples are only examples. Various display expressions such as graphic information G, measurement content K, measurement value N, gradation expression U, etc. may be displayed alone or in any combination.

The display form for clearly indicating the measurement point as shown in the display examples of FIGS. 3 and 4 can be realized by, for example, adopting the following configuration. That is, the storage unit 110 further stores a measurement point on the object to be measured corresponding to the predetermined measurement result. The extraction unit 140 further extracts the measurement point in the object to be measured corresponding to the predetermined measurement result. The display control unit 150 causes the display unit 130 to display the predetermined measurement result of the target object so as to be understood which portion of the target object visually recognized on the display unit 130 corresponds to the measurement point corresponding to the predetermined measurement result.

According to the measurement result display apparatus 100 of the present invention configured as described above, the measurement result of the object to be measured can be easily viewed. Further, it is possible to extract a measurement result of the desired object to be measured from the measurement results of the plurality of objects to be measured only by detecting the object to be measured by the three-dimensional sensor.

The measurement result display apparatus 100 of the present invention may be configured as a head-mounted display device or a wearable device mounted on a head of a user. In such a measurement result display apparatus 100, the display unit 130 is arranged to face the eye of the user, and the three-dimensional sensor 120 is arranged to detect shape information of the object existing in the display range of the display unit.

By the user wearing the measurement result display apparatus 100 configured as described above on the head, the measurement result of the target object can be displayed on the display unit 130 only by the user looking at the target object through the display unit 130.

In this case, the display control unit 150 may change the display position of the predetermined measurement result in accordance with the change of the detection position of the target object of detected by the three-dimensional sensor 120 with the movement of the head of the user. This can prevent the display from disappearing due to the movement of the head.

The measurement result display apparatus 100 of the present invention may further include an imaging unit 160 for imaging the object detected by the three-dimensional sensor 120. Then, the storage unit 110 may further store a predetermined individual identification information corresponding to each of the plurality of measured objects. The extraction unit 140 may search the storage unit 110 and extract the predetermined measurement result of the target object based on the shape information detected by the three-dimensional sensor 120 and the predetermined individual identification information indicated on the target object imaged by the imaging unit 160. In the case where the three-dimensional sensor 120 is realized by an imaging unit that captures a two-dimensional image, the three-dimensional sensor 120 may serve as the imaging unit 160.

Owing to such a configuration, even when there is a plurality of objects to be measured having the same shape, the measurement result of the target object can be extracted based on the individual identification information.

Second Embodiment

Figure 5:
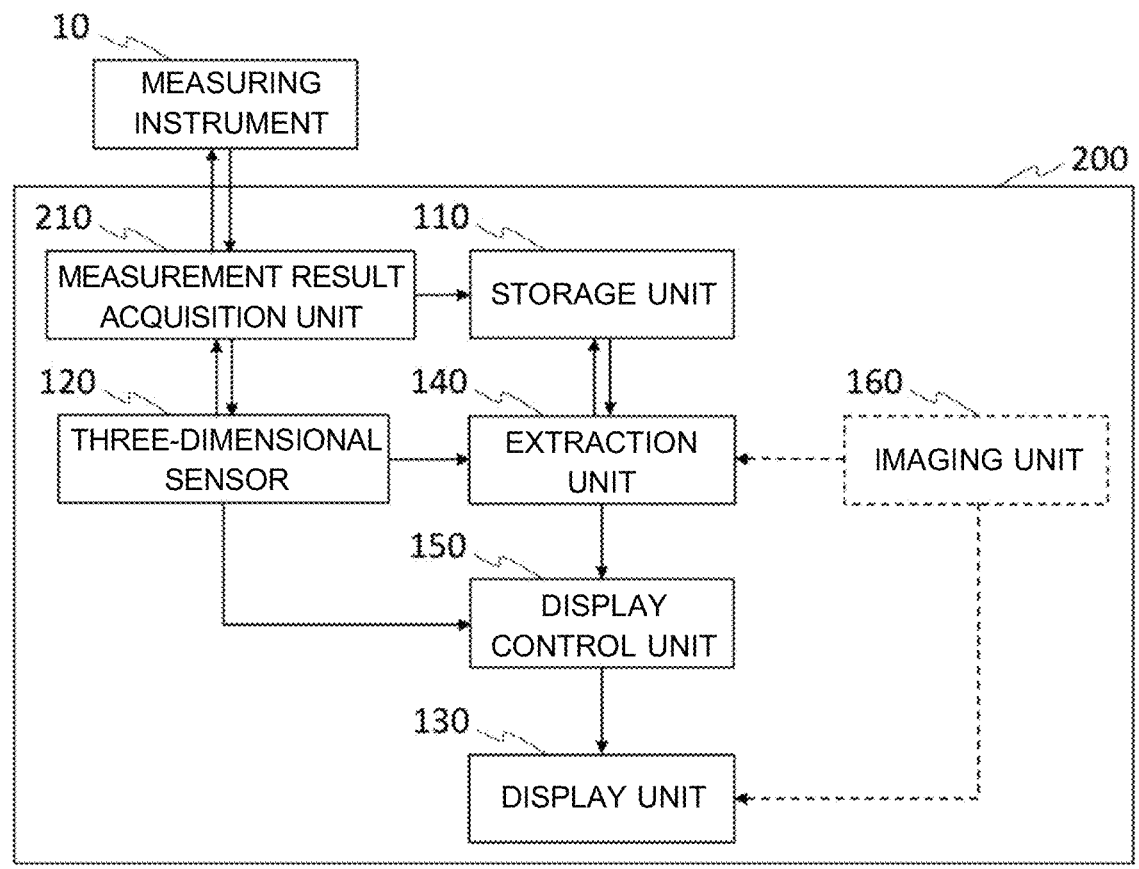
FIG. 5 is a functional block diagram of a measurement result display apparatus 200 of the present invention.
Figure 6:
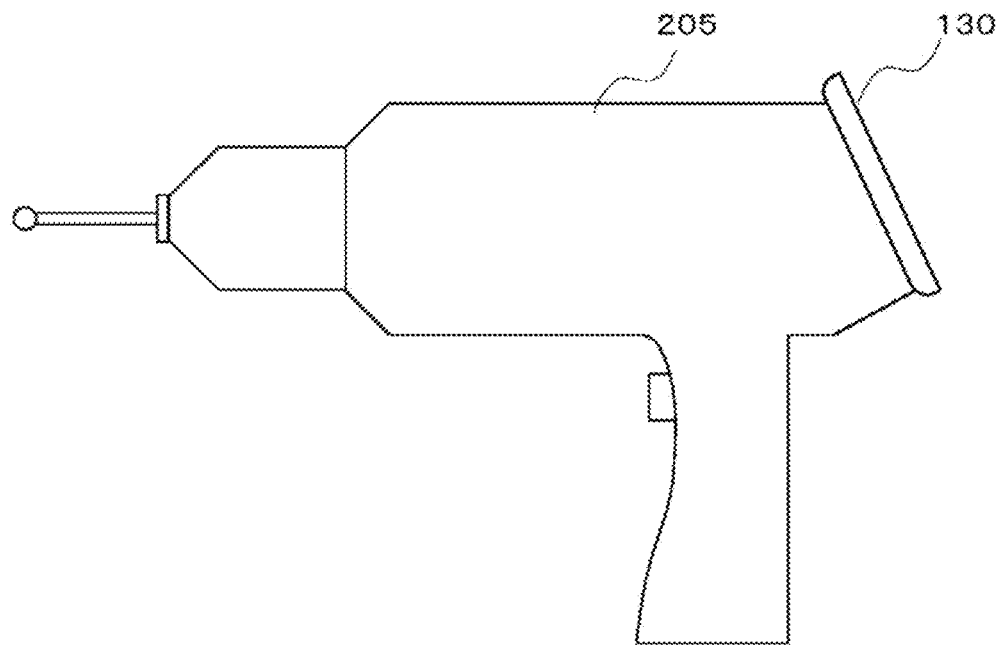
FIG. 6 is a diagram illustrating an example of a measurement result display apparatus integrated with a probe.

FIG. 5 is a block diagram showing the configuration of the measurement result display apparatus 200 of the present invention. The measurement result display apparatus 200 further includes a measurement result acquisition unit 210 in addition to the configuration of the measurement result display apparatus 100 of the first embodiment. In FIG. 5, the measurement result display apparatus 200 is depicted as being separate from the measuring instrument 10, but the measurement result display apparatus 200 may be configured integrally with the components of the measuring instrument 10. For example, when the measuring instrument 10 includes a probe of a type which is held and operated by a user, the probe 205 and the measurement result display apparatus 200 may be integrally configured such that the display unit 130 is located at a position which is easily viewable by the user in a state where the probe 205 is held by the user, as shown in FIG. 6, for example. In this manner, the user can confirm the measurement result displayed on the display unit 130 while holding the probe 205 in his/her hand and performing the measurement, without moving his/her line of sight from the measurement position to a large extent.

The measurement result acquisition unit 210 causes the measuring instrument 10 that performs measurement of the object to be measured to perform predetermined measurement, and acquires the result. In addition, the measurement result acquisition unit 210 causes the three-dimensional sensor 120 to detect the shape information of the object to be measured and the measurement position by the measuring instrument 10 at the time of performing the measurement. Then, the measurement result acquisition unit 210 stores the shape information of the object to be measured and the predetermined measurement result at the measurement point in the storage unit 110. The method of transmitting and receiving information to and from the measuring instrument 10 and the form of communication such as wired communication and wireless communication are arbitrary.

This makes it possible to collect information on the measurement results that should be stored in advance in the storage unit 110.

Third Embodiment

The functions of the respective components of the measurement result display apparatuses 100 and 200 of the present invention may be realized by being described in a program and being executed by a computer.

Figure 7:
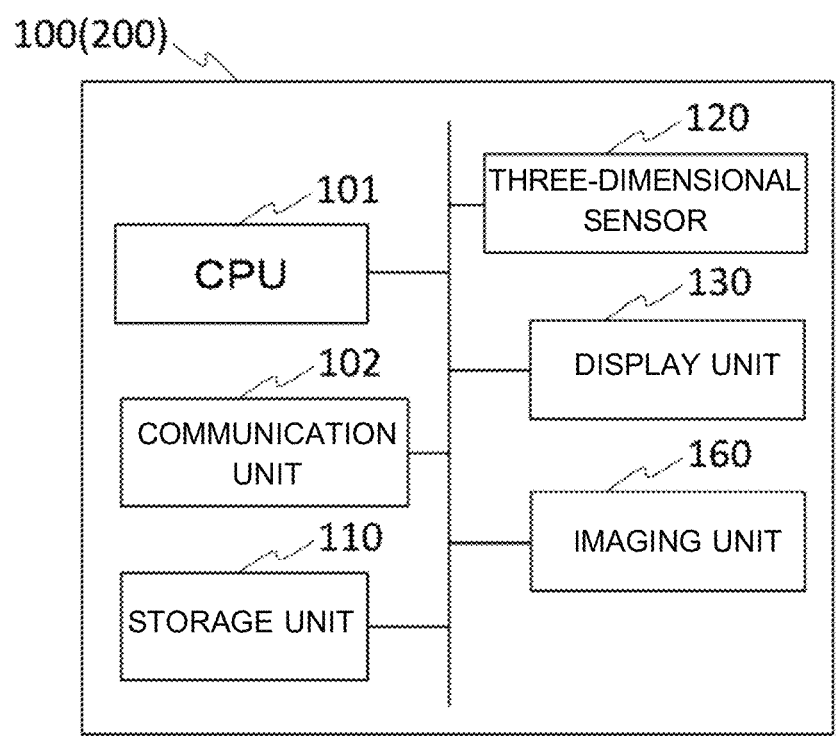
FIG. 7 is a diagram showing a configuration example of the measurement result display apparatuses 100 and 200 of the present invention which the functions of respective components are realized by the CPU executing a program in which the functions of respective component are described.

FIG. 7 shows an example of the configuration of the measurement result display apparatuses 100 and 200 when the functions of the respective configurations are described in the program and executed by the computer.

The measurement result display apparatuses 100 and 200 include, for example, a CPU 101, a communication unit 102, a storage unit 110, a three-dimensional sensor 120, a display unit 130, and an imaging unit 160.

The CPU 101 executes programs stored in the storage unit 110 in which the functions of the components are described. The CPU 101 realizes the functions of the measuring result apparatuses 100 and 200.

The communication unit 102 is an interface for connecting to a wireless network or a wired network. The communication unit 102 transmits and receives data to and from a measuring instrument, a cloud storage connected to networks, and the like under the control of the CPU 101.

The storage unit 110 is an arbitrary storage means that stores shape information, a predetermined measurement result and a measurement point thereof, and a program for each of a plurality of objects to be measured. As the storage unit 110, for example, in addition to a storage medium such as an HDD or a flash memory, a nonvolatile memory, a volatile memory, or the like can be employed. Instead of being provided in the measurement result display apparatuses 100 and 200, the storage unit 110 may be realized by employing a cloud storage connected via the communication unit 102.

The three-dimensional sensor 120 detects shape information of an object existing in a three-dimensional space.

The display unit 130 is configured so that the object detected by the three-dimensional sensor 120 can be visually recognized, and displays various types of information under the control of CPU 101.

The imaging unit 160 images an image of the object or the like detected by the three-dimensional sensor 120.

Fourth Embodiment

The measurement result display apparatus 400 according to the fourth embodiment differs from the measurement result display apparatuses described in the first to third embodiments in the means for realizing the function of displaying the predetermined measurement result of the target object on the display unit 130 so as to be visually recognized together with the target object. Components of the measurement result display apparatus that are common to those of the measurement result display apparatuses described in the first to third embodiments are denoted by the same reference numerals, and the description thereof is omitted unless there is a particular matter in addition to the configurations described in the first to third embodiments.

Figure 8:
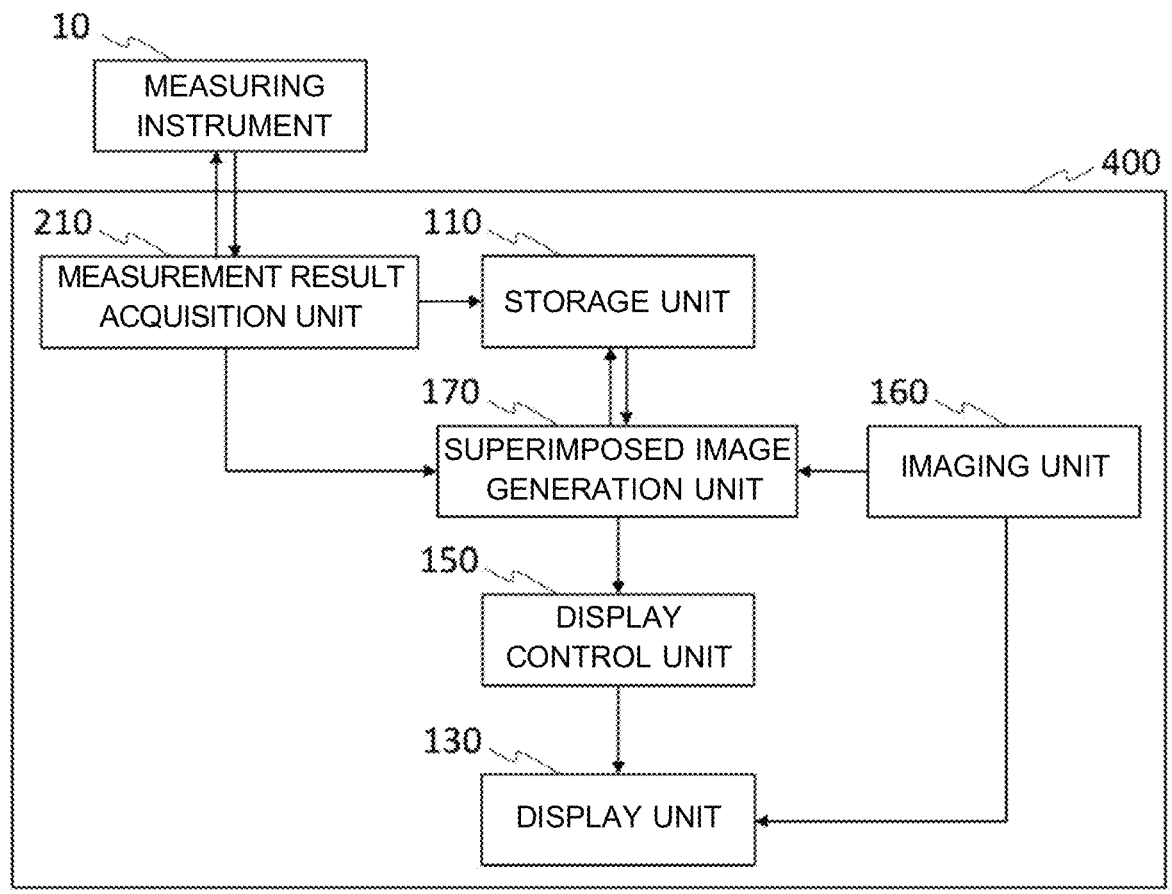
FIG. 8 is a functional block diagram of a measurement result display apparatus 400 of the present invention.

As shown in FIG. 8, the measurement result display apparatus 400 according to the fourth embodiment includes a storage unit 110, a display unit 130, an imaging unit 160, a superimposed image generation unit 170, a display control unit 150, and a measurement result acquisition unit 210.

The measurement result display apparatus 400 of the present embodiment does not include a three-dimensional sensor, and obtains a measurement result of the object to be measured including three-dimensional coordinates in the measurement coordinate system from the measurement instrument 10. The measurement result display apparatus 400 may be formed integrally with a component of a three-dimensional measuring instrument (e.g., a probe head) that performs measurement.

The storage unit 110 of the present embodiment stores shape information of the object to be measured in advance. The shape information may be three-dimensional shape information, specifically, a three-dimensional model of the object to be measured or the like. In addition, the storage unit 110 stores the measurement result of the object to be measured using the probe.

The imaging unit 160 of the present embodiment images an image of an object to be measured by the measuring instrument 10. The imaging unit 160 of the present embodiment is configured to be able to grasp the position and orientation of the imaging unit 160 at the time of imaging. For example, the imaging unit 160 may be arranged at the distal end of the probe of the measuring instrument 10 in a direction directed toward the object to be measured at the time of measurement, and may be configured to determine the position and the orientation of the imaging unit 160 in the measurement coordinate system based on the position and the orientation of the probe acquired by the measuring instrument 10.

The superimposed image generating unit 170 generates an image of the object to be measured when the object to be measured is viewed from the position and orientation of the imaging unit based on the shape information of the object to be measured, the position and orientation of the imaging unit 160, and the measurement result by the measuring instrument 10, which are stored in the storage unit 110 in advance, and outputs a two-dimensional image in which information indicating the measurement result is combined with the image.

The display control unit 150 causes the display unit 130 to display the two-dimensional image generated by the superimposed image generation unit 170, superimposed on the image captured by the imaging unit 160. The display control unit 150 may semi-transparently superimpose the two-dimensional image generated by the superimposed image generation unit 170 on the image captured by the image capturing unit 160.

With such a configuration, according to the measurement result display apparatus 400 of the fourth embodiment, since the measurement result of the desired object to be measured is displayed on the display unit, the measurement result can be easily viewed. In addition, since the measurement result display apparatus 400 of the present embodiment does not include a three-dimensional sensor, cost can be suppressed. In addition, processing such as acquiring shape information of an object with a three-dimensional sensor or specifying an object to be measured based on the shape information of the object is unnecessary, and the processing load can be reduced.

Fifth Embodiment

The measurement result display apparatus 500 according to the fifth embodiment has a function of displaying a predetermined measurement result of the target object on the display unit 130 so as to be visually recognized together with the object, and a function of outputting the measurement result as a report. Except for the configuration for realizing the function of outputting the measurement result as the report, the measurement result display apparatus is the same as the measurement result display apparatus described in any of the first to fourth embodiments, and therefore description related to the common configuration is omitted.

Figure 9:
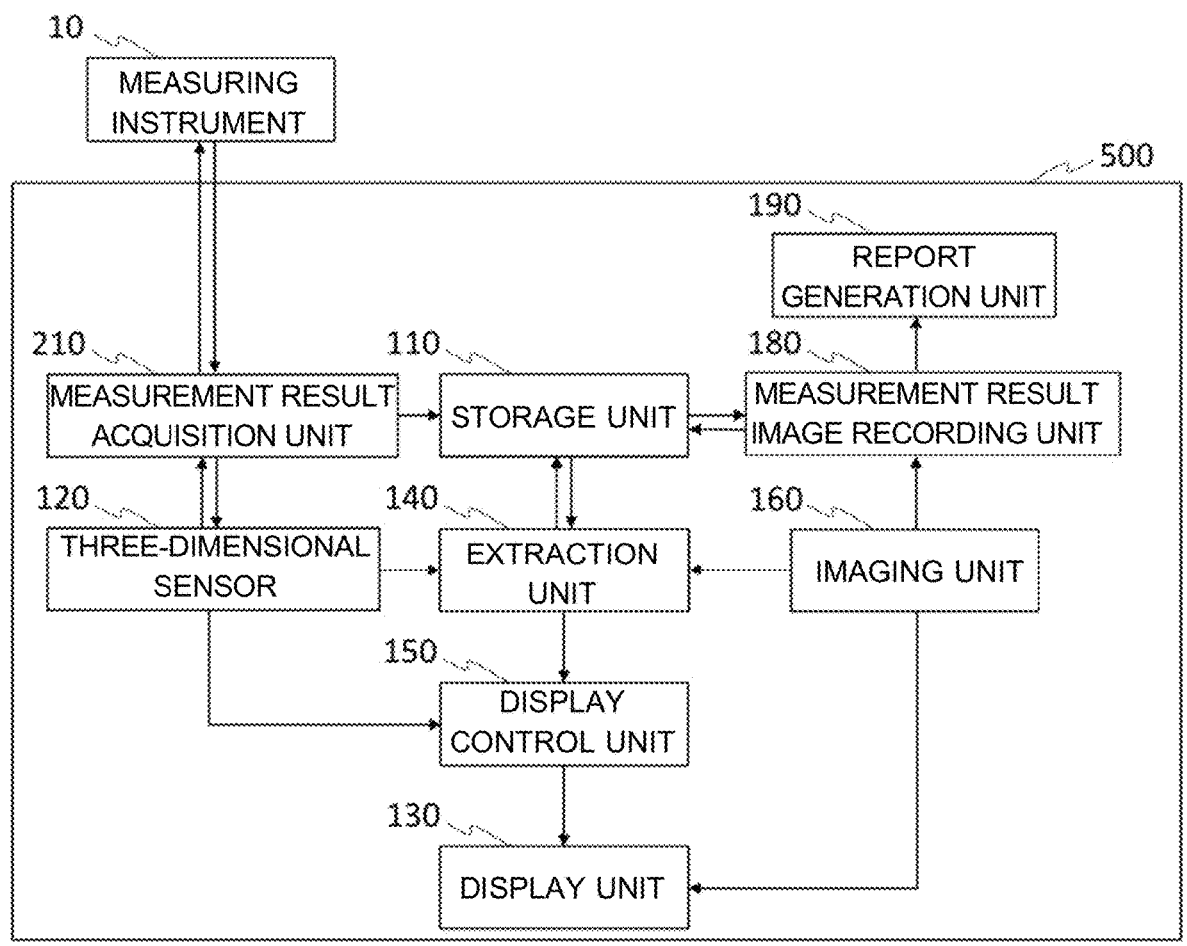
FIG. 9 is a functional block diagram of a measurement result display apparatus 500 of the present invention.

As shown in FIG. 9, the measurement result display apparatus 500 of the present embodiment includes a measurement result image recording unit 180 and a report generating unit 190 in addition to the same configuration as the measurement result display apparatuses described in the first to fourth embodiments.

The measurement result image recording unit 180 generates a measurement result image in which the predetermined measurement result of the target object is superimposed on the target object based on the image captured by the imaging unit 160 and the measurement result stored in the storage unit 110, and stores the measurement result image in the storage unit 110 in association with information identifying the target object, that is, the object to be measured. The measurement result image recorded by the measurement result image recording unit 190 includes a scene similar to the scene visually recognized by the user when the predetermined measurement result of the target object is displayed on the display unit 130 so as to be visually recognized together with the target object.

In the case where a configuration capable of detecting a measurement point is employed similarly to the measurement result display apparatus 200 of the second embodiment, the measurement result image recording unit 180 may store the generated measurement result image and the measurement point in the storage unit 110 in association with each other.

The report generating unit 190 generates a report including the measurement result for each object to be measured. In this report, measurement result images corresponding to the object to be reported are arranged in a predetermined layout. When there is a plurality of measurement points with respect to the object to be measured, and the measurement result image recording unit 180 stores the measurement result image in association with the measurement point in the storage unit 110, the report generating unit 190 may generate a report in which the measurement result images of the respective measurement points are arranged in a predetermined layout. The format of the report generated by the report generation unit 190 is arbitrary. The report generation unit 190 may output the report as an electronic file or may output the report printed on paper.

As described above, according to the measurement result display apparatus 500 of the fifth embodiment, it is possible to easily generate a report including the same image as the scene viewed by the user at the time of measurement.

The present invention is not limited to the above embodiments. Each embodiment is exemplified, and any embodiment having substantially the same constitution as the technical idea described in the claims of the present invention and exhibiting the same operation and effect is included in the technical scope of the present invention. That is, the present invention can be suitably modified within the scope of the technical idea expressed in the present invention, and forms to which such modifications and improvements are added are also included in the technical scope of the present invention.

What is claimed is:

1. A measurement result display apparatus comprising:
a storage unit for storing shape information and predetermined measurement results for each of a plurality of objects to be measured in advance;
a three-dimensional sensor for detecting shape information of an object existing in a three-dimensional space;
a display unit configured so that the object detected by the three-dimensional sensor is visually recognized and configured to be capable of displaying predetermined information;
an extraction unit for retrieving and extracting the predetermined measurement result of the target object from the storage unit based on the shape information detected by the three-dimensional sensor; and
a display control unit for displaying the predetermined measurement result of the target object on the display unit so as to be visually recognized together with the object, using the object to be measured whose shape information is detected by the three-dimensional sensor as the target object,
wherein the display control unit displays the predetermined measurement result of the object extracted by the extraction unit on the display unit so as to be visually recognized together with the object.

2. The measurement result display apparatus according to claim 1, wherein the measurement result display apparatus is configured as a head mounted display device or a wearable device mounted on a head of a user,
wherein the display unit is arranged to face the eye of the user, and the three-dimensional sensor is arranged to detect the shape information of the object present in the display range of the display unit.

3. The measurement result display apparatus according to claim 2, wherein the display control unit changes the display position of the predetermined measurement result in accordance with a change of the detection position of the target object detected by the three-dimensional sensor with the movement of the head of the user.

4. The measurement result display apparatus according to claim 1 wherein the storage unit further stores a measurement point on the object to be measured corresponding to the predetermined measurement result,
wherein the extraction unit further extracts the measurement point on the object to be measured corresponding to the predetermined measurement result, and
wherein the display control unit causes the display unit to display the predetermined measurement result of the object so to be understood which portion of the target object visible on the display corresponding to the measurement point corresponding to the predetermined measurement result.

5. The measurement result display apparatus according to claim 4, further comprises a measurement result acquisition unit that causes a measuring instrument that executes the measurement of the object to be measured to execute the predetermined measurement to acquire a result, causes the three-dimensional sensor to detect the shape information of the object to be measured and a measurement point by the measuring instrument at the time of execution of the measurement, and stores the shape information of the object to be measured and the predetermined measurement result at the measurement point in the storage unit.

6. The measurement result display apparatus according to claim 1 further comprises an imaging unit for imaging the object detected by the three-dimensional sensor,
wherein the storage unit further stores predetermined individual identification information corresponding to each of the plurality of objects to be measured, and
wherein the extraction unit retrieves and extracts the predetermined measurement result of the target object by searching the storage unit based on the shape information detected by the three-dimensional sensor and the predetermined individual identification information indicated on the target object imaged by the imaging unit.

7. A non-transitory computer-readable storage medium having stored thereon executable instructions that when executed by processor of computer control the computer to perform as the measurement result display apparatus according to claim 1.

* * * * *